(12) United States Patent
Underwood et al.

(10) Patent No.: US 8,386,594 B2
(45) Date of Patent: Feb. 26, 2013

(54) NETWORK CONTROLLER CIRCUITRY TO INITIATE, AT LEAST IN PART, ONE OR MORE CHECKPOINTS

(75) Inventors: Keith D. Underwood, Albuquerque, NM (US); David N. Lombard, Rossmoor, CA (US); Jan Uerpmann, Braunschweig (DE); Steffen Kosinski, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 367 days.

(21) Appl. No.: 12/704,240

(22) Filed: Feb. 11, 2010

(65) Prior Publication Data

US 2011/0196950 A1 Aug. 11, 2011

(51) Int. Cl.
*G06F 15/173* (2006.01)
(52) U.S. Cl. ............. 709/223; 709/224; 714/13; 714/34
(58) Field of Classification Search .................. 709/223, 709/224, 203, 217, 219; 714/13, 34
See application file for complete search history.

(56) References Cited

U.S. PATENT DOCUMENTS

| | | | |
|---|---|---|---|
| 6,622,263 B1* | 9/2003 | Stiffler et al. .................... | 714/13 |
| 7,505,410 B2* | 3/2009 | Lakshmanamurthy et al. .............................. | 370/235 |
| 2004/0139440 A1* | 7/2004 | Browning et al. ............ | 718/107 |
| 2005/0262411 A1* | 11/2005 | Vertes et al. .................... | 714/741 |
| 2006/0053331 A1* | 3/2006 | Chou et al. ........................ | 714/2 |
| 2007/0028144 A1* | 2/2007 | Graham et al. ................. | 714/34 |
| 2007/0260920 A1* | 11/2007 | Turner et al. .................... | 714/17 |
| 2008/0295111 A1* | 11/2008 | Craft et al. ..................... | 719/313 |
| 2009/0037550 A1* | 2/2009 | Mishra et al. .................. | 709/208 |
| 2009/0183027 A1* | 7/2009 | Subhraveti ...................... | 714/13 |
| 2010/0070678 A1* | 3/2010 | Zhang et al. ...................... | 711/6 |
| 2010/0077164 A1* | 3/2010 | Stiffler et al. .................. | 711/162 |
| 2011/0083040 A1* | 4/2011 | Varadarajan et al. ........... | 714/13 |
| 2011/0258625 A1* | 10/2011 | Waldspurger et al. ............ | 718/1 |

OTHER PUBLICATIONS

"Berkley Lab Checkpoint/Restart (BLCR)", Future Technologies Group, retrieved on: Dec. 28, 2009, 4 Pages. Document available at: https://ftg.lbl.gov/CheckpointRestart/CheckpointRestart.shtml.
"Berkeley Lab Checkpoint/Restart (BLCR) User's Guide", version 0.8.2, retrieved on: Dec. 28, 2009,10 Pages. Document available at: https://upc-bugs.lbl.gov//blcr/doc/html/BLCR_Users_Guide.html.
"Berkeley Lab Checkpoint/Restart (BLCR) Administrator's Guide", version 0.8.2, retrieved on: Dec. 28, 2009,10 Pages. Document available at: https://upc-bugs.lbl.gov//blcr/doc/html/BLCR_Admin_Guide.html.
"BLCR Frequently Asked Questions", for version 0.8.2, retrieved on Dec. 28, 2009, 12 Pages. Document available at: https://upc-bugs.lbl.gov//blcr/doc/html/FAQ.html.

(Continued)

*Primary Examiner* — Lashonda Jacobs
(74) *Attorney, Agent, or Firm* — Christopher K. Gagne

(57) ABSTRACT

An embodiment may include network controller circuitry to be included in a first host computer that includes a host processor to execute an operating system environment. The circuitry may initiate, at least in part, one or more checkpoints of, at least in part, one or more states associated with, at least in part, the operating system environment and network traffic between the first host computer and a second host computer. The circuitry also may coordinate, at least in part, respective execution, at least in part, of the one or more checkpoints with respective execution of one or more other respective checkpoints of the second host computer. Of course, many alternatives, variations, and modifications are possible without departing from this embodiment.

18 Claims, 5 Drawing Sheets

OTHER PUBLICATIONS

Hargrove, P. et al., "An Overview of Berkeley Lab Checkpoint/Restart (BLCR) for Linux Clusters", Mar. 18, 2008, 14 Pages.

Roman, E. "A Survey of Checkpoint/Restart Implementations", Jul. 25, 2002, pp. 1-9.

"Cray SX-6, Scalable Vector Solutions", Cray, Inc., Product Overview, 2002, 2 Pages.

Duell, Jason "The Design and Implementation of Berkeley Lab's Linux Checkpoint/Restart", 2005, 17 Pages.

Torres, G. "Everything You Need to Know About the CPU C-States Power Saving Modes", Sep. 5, 2008, 8 Pages. Document available at: http://www.hardwaresecrets.com/printpage/611.

Shimpi, Anand L., "Intel's Atom Architecture: The Journey Begins", AnandTech, Apr. 2, 2008, 38 Pages. Document available at: http://www.anandtech.com/printarticle.aspx?i=3276.

Hargrove, P. H., et al., "Berkeley Lab Checkpoint/Restart (BLCR) for Linux Clusters", 2006, 6 Pages.

"MPI: A Message-Passing Interface Standard", Version 2.2, Message Passing Interface Forum, Sep. 4, 2009, pp. 1-647.

"NERSC First to Reach Decade-Long Goal of Seamless Shutdown, Restart on Massively Parallel Processing System", National Energy Research Scientific Computing Center, Oct. 21, 1997, 2 Pages. Document available at: http://www.nersc.gov/news/newsroom/checkpoint10-21-97.php.

Quadrics, "Shmem Programming Manual", Document Version 3, Jun. 27, 2001, 104 Pages.

Ta-Shma, P. et al., "Virtual Machine Time Travel Using Continuous Data Protection and Checkpointing", IBM Haifa Labs, SYSTOR Virtualization Workshop, Oct. 2007, 15 Pages.

Agarwal, S. et al., "Adaptive Incremental Checkpointing for Massively Parallel Systems", IBM India Research Labs, Proceedings of the 18th annual international conference on Supercomputing, Jun. 26-Jul. 1, 2004, pp. 277-286.

* cited by examiner

… (1)

NETWORK CONTROLLER CIRCUITRY TO INITIATE, AT LEAST IN PART, ONE OR MORE CHECKPOINTS

FIELD

This disclosure relates to network controller circuitry to initiate, at least in part, one or more checkpoints.

BACKGROUND

In one conventional high performance computing arrangement, a user is allocated multiple nodes in a network to perform a computing task. The nodes execute application threads involved in the task, and coordinate the execution of the threads by passing network messages among themselves. Given the complexity of this computing arrangement, it is possible for the network, nodes, and/or application threads to fail. Accordingly, software agents are provided in the nodes in the network to periodically request the storing of information related to the nodes' internal states in order to facilitate recovery in the event of such failure.

In this conventional arrangement, the state information obtained by the software agents may be of limited utility unless, when the state information is obtained, the network and applications are in a consistent, quiescent state. Unfortunately, this may delay the obtaining of such information until after the network and applications have entered a consistent, quiescent state.

Additionally, in this conventional arrangement, the state information may be stored in network attached hard disk storage that is remote from one or more of the nodes. The amount of access time associated with such storage may be higher than is desirable, and therefore, may increase the amount of time involved in storing and/or retrieving such information beyond that which is desirable.

Also, after a failure-related restart of an application, the assignment of one or more computing tasks to one or more nodes in the network may have changed relative to that which may have prevailed prior to the restart. In this conventional arrangement, the determination of and compensation for these differences may involve a global communications to reconfigure the network and also may involve intervention of application level software.

Furthermore, in this conventional arrangement, an application may issue a command intended for another node by indicating a logical address for that node. Software processes translate the logical address into a physical address to be used to communicate with the node. The software processes may perform the translation based upon rigidly predetermined algorithmic address assignments and/or one or more look up tables in which all possible logical and physical addresses are stored, in full, in memory. Unfortunately, this may consume undesirably large amounts of host processor bandwidth and/or memory space, and may result in address translation operations being carried out more slowly than desired. It may also introduce undesirable inflexibility into address assignments, and may make node-to-computing-task re-assignment (e.g., of the type discussed above) more difficult than is desired.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
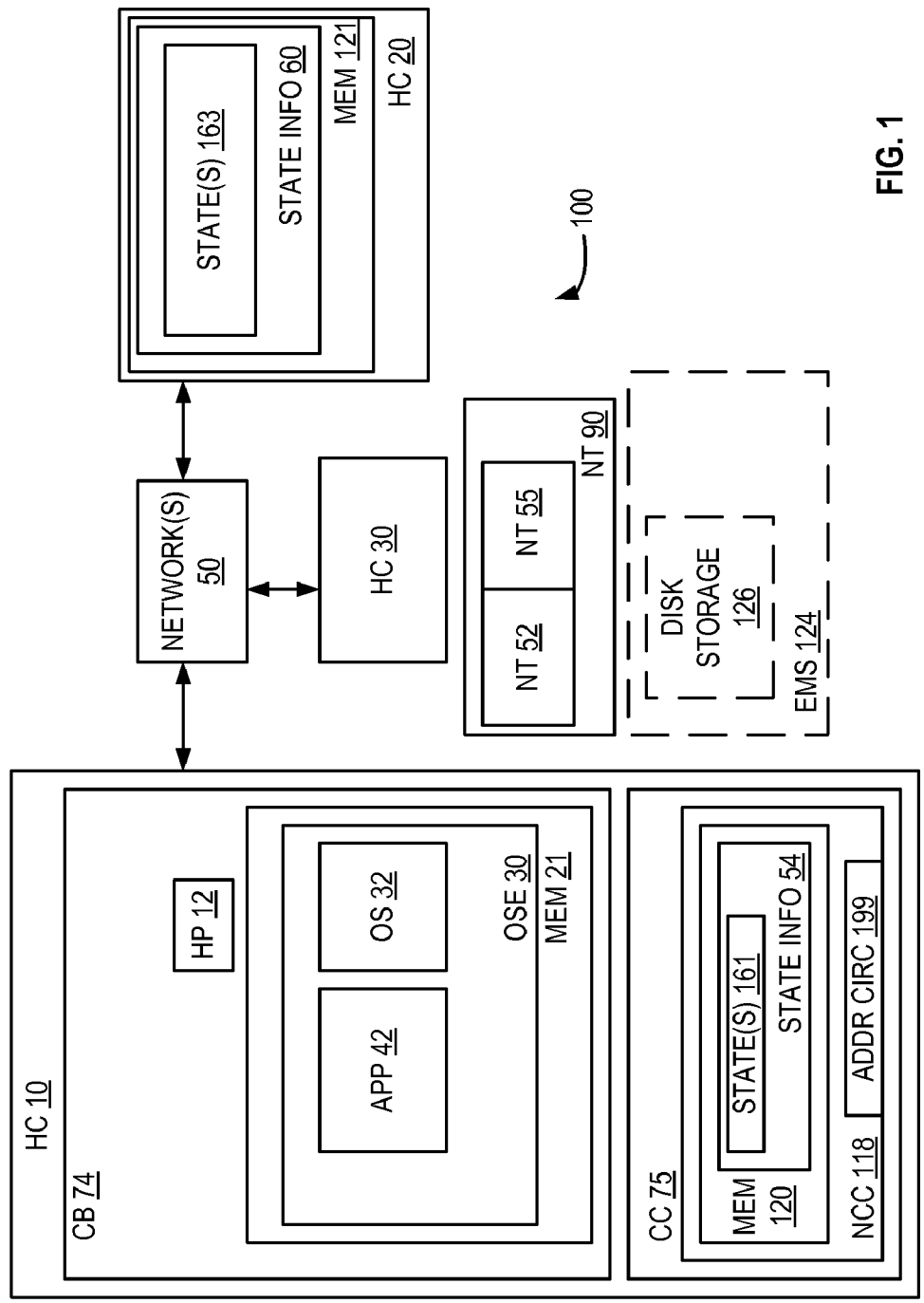
FIG. 1 illustrates a system embodiment.

FIG. 1 illustrates a system embodiment 100. System 100 may include host computers (HC) 10, 20, and 30 that may be communicatively coupled together via one or more wireless and/or wired networks 50. Each of the host computers 10, 20, and/or 30 may be geographically remote from each other. In this embodiment, the terms "host computer," "host," "server," and "node" may be used interchangeably, and may mean, for example, one or more end stations, smart phones, tablet computers, appliances, intermediate stations, network interfaces, clients, servers, and/or portions thereof. In this embodiment, a "network" may be or comprise any mechanism, instrumentality, modality, and/or portion thereof that permits, facilitates, and/or allows, at least in part, two or more entities to be communicatively coupled together. Also in this embodiment, a first entity may be "communicatively coupled" to a second entity if the first entity is capable of transmitting to and/or receiving from the second entity one or more commands and/or data. In this embodiment, a "wireless network" means a network that permits, at least in part, at least two entities to be wirelessly communicatively coupled, at least in part. In this embodiment, a "wired network" means a network that permits, at least in part, at least two entities to be communicatively coupled, at least in part, via non-wireless means, at least in part. In this embodiment, data may be or comprise one or more commands (for example one or more program instructions), and/or one or more such commands may be or comprise data. Also in this embodiment, an "instruction" may include data and/or one or more commands.

Host computer 10 may comprise circuit board (CB) 74 and circuit card (CC) 75. In this embodiment, CB 74 may comprise, for example, a system motherboard and may be physically and communicatively coupled to CC 75 via a not shown bus connector/slot system. CB 74 may comprise one or more single and/or multi-core host processors (HP) 12 and computer-readable/writable memory 21. Although not shown in the Figures, CB 74 also may comprise one or more chipsets (comprising, e.g., memory and/or input/output controller circuitry). One or more host processors 12 may be communicatively coupled via the one or more chipsets to memory 21 and CC 75.

CC 75 may comprise network controller circuitry (NCC) 118. Circuitry 118 may comprise computer-readable/writable memory 120 and address translation circuitry 199.

Alternatively or additionally, although not shown in the Figures, some or all of circuitry 118 and/or the functionality and components thereof may be comprised in, for example, CB 74 (e.g., in one or more host processors 12 and/or the one or more not shown chipsets). Also alternatively, one or more host processors 12, memory 21, the one or more not shown chipsets, and/or some or all of the functionality and/or components thereof may be comprised in, for example, circuitry 118 and/or CC 75. Many other alternatives are possible without departing from this embodiment.

Although not shown in the Figures, each of the nodes 20 and/or 30 may comprise, in whole or in part, respective components and/or functionality of host computer 10. As used herein, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, processor core, core, and controller each may comprise respective circuitry capable of performing, at least in part, one or more arithmetic and/or logical operations, such as, for example, one or more respective central processing units. Also in this embodiment, a chipset may comprise circuitry capable of communicatively coupling, at least in part, one or more host processors, storage, mass storage, one or more nodes, and/or memory. Although not shown in the Figures, host computer 10 may comprise a graphical user interface system. The not shown graphical user interface system may comprise, e.g., a respective keyboard, pointing device, and display system that may permit a human user to input commands to, and monitor the operation of, host computer 10, node 20, node 30, and/or system 100.

One or more machine-readable program instructions may be stored in computer-readable/writable memory 21 and/or memory 120. In operation of host computer 10, these instructions may be accessed and executed by one or more host processors 12 and/or circuitry 118. When executed by one or more host processors 12 and/or circuitry 118, these one or more instructions may result in operating system environment (OSE) 30 being executed at least in part by one or more host processors 12 and/or NCC 118 and becoming resident at least in part in memory 21. Also when executed by one or more host processors 12 and/or circuitry 118, these one or more instructions may result in one or more host processors 12, circuitry 118, OSE 30, and/or one or more other applications and/or operating systems comprised in OSE 30, performing the operations described herein as being performed by these components of system 100. In this embodiment, an operating system environment may be or comprise one or more portions of one or more operating systems, one or more applications, one or more programs, and/or one or more associated processes. In this embodiment, a portion of an entity may comprise all or less than all of the entity. Also, in this embodiment, a process, program, driver, operating system, and application may be used interchangeably, and may comprise and/or result at least in part from execution of one or more program instructions. Memory 21 may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory. Memory 120 may be or comprise one or more types of memory (e.g., semiconductor flash and/or phase change memory) that may have relatively faster access time relative to electro-mechanical storage (EMS 124, shown in ghost in FIG. 1) access time. By way of example, EMS 124 may be magnetic and/or optical disk storage 126. In this embodiment, memory 120 may be directly coupled and/or attached to circuitry 118, and/or may be mounted directly to circuit card 75.

As stated previously, each of the host computers 10, 20, and/or 30 may be geographically remote from each other. In this embodiment, the execution of one or more applications 42 may be distributed, at least in part, among the nodes 10, 20, and/or 30. For example, one or more threads of one or more applications 42 may be executed, at least in part, by host processor 12 and node 20. In order to facilitate this distributed processing, circuitry 118 may be capable of receiving and/or transmitting network traffic (NT) 90 that may comprise, at least in part, one or more messages (not shown) associated with and/or to facilitate, at least in part, execution of one or more applications 42. For example, network traffic 90 may comprise network traffic 52 that may be transmitted from circuitry 118 to node 20 via one or more networks 50. Additionally or alternatively, network traffic 90 may comprise network traffic 55 that may be transmitted from node 20 via one or more networks 50, and received by circuitry 118. Network traffic 90 may comprise one or more packets (not shown) that may be compatible with one or more protocols.

In system 100, one or more processors 12 may execute one or more instructions that may result in OSE 30 being executed by one or more processors 12 and in OSE 30 becoming resident in memory 21. In this embodiment, OSE 30 may comprise, for example, operating system 32 and/or one or more applications 42.

Figure 5:
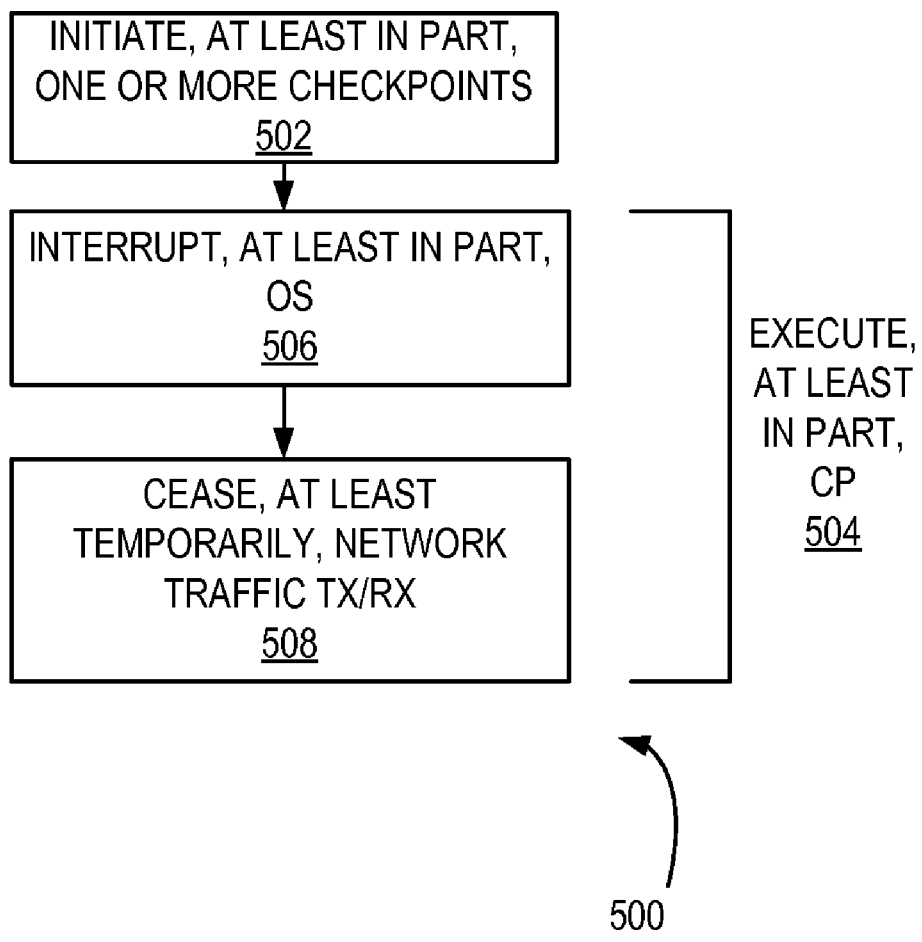
FIG. 5 illustrates operations in an embodiment.

Reference now is being specifically made to FIGS. 1 and 5. FIG. 5 illustrates operations 500 that may be performed in system 100. At, for example, periodic time intervals following the start of an application residing in node 10 and/or system 100, circuitry 118 may initiate, at least in part, one or more checkpoints of, at least in part, one or more states associated with, at least in part, operating system environment 30 and/or network traffic 90, at least in part (see operation 502). In this embodiment, a checkpoint and/or execution of a checkpoint may be or comprise, at least in part, the reception, generation, obtaining, and/or recordation, at least in part, of information embodying, related to, describing, indicating, associated with, involving, referencing, comprising, and/or based upon, directly or indirectly, one or more states of one or more entities. In this embodiment, a state of an entity may be or comprise, at least in part, (1) an internal or external contents, context, condition, operation, function, attribute, instrumentality, calculation and/or activity of, being executed by, executable by, and/or associated with, at least in part, the entity, and/or (2) data and/or information describing, related to, involved in, comprised in, associated with, useful for, facilitating, and/or based upon, directly or indirectly, at least in part, such contents, context, condition, operation, function, attribute, instrumentality, calculation, and/or activity. Particular examples of states and/or state information in this embodiment may include software, hardware, process, communication, protocol, and input/output context information, value of in-flight and/or intermediate calculations, iterative convergence and/or equation variable-related data, open files and/or connections, etc.

For example, in this embodiment, a not shown processor and/or controller in circuitry 118 may perform operation 502, at least in part, by signaling circuitry 118. This may result in circuitry 118 executing, at least in part (see operation 504) the one or more checkpoints by performing, at least in part, operations 506 and 508. As part of operation 504, circuitry 118 may issue, at least in part, one or more interrupts to operating system 32. This may result, at least in part, in the interrupting, at least in part, of operating system 32 (see operation 506) to allow operating system 32 to stop execution, at least in part, of one or more applications 42 by processor 12. Contemporaneously, circuitry 118 may cease, at least temporarily, transmitting any new network traffic 55 to node 20 and may cease, at least temporarily, accepting and/or receiving any new network traffic 52 from node 20 (see operation 508). Additionally, circuitry 118 may place one or more not shown processing engines in circuitry 118 into one or more stable states. Circuitry 118 also may request that the host processor 12 enter a relatively powered down mode of operation (e.g., relative to its current, fully powered up mode of operation), such as, a mode in which the not shown processor core clock, phase lock loop, and caches of the processor 12 may be in a powered down state. Prior to entering such a mode of operation, the processor's internal state may be saved, so as to be part of information 54. These operations may permit circuitry 118, as part of operation 504, to obtain, record, and/or store, at least in part, state information 54 in memory 120.

State information 54 may indicate and/or comprise, at least in part, one or more current states 161 of and/or associated with, at least in part, operating system environment 30, one or more operating systems 32, network traffic 90, and/or one or more applications 42. In this embodiment, the state information 54 and/or one or more states 161 may permit and/or facilitate recovery and/or roll back, at least in part, of at least a portion of node 10 (and/or one or more components thereof) to the one or more states 161 in such a way to permit, at least in part, node 10 (and/or one or more components thereof) to restart operation thereafter from the one or more states 161 without loss of meaningful operational information and/or meaningful operational compromise.

In this embodiment, as part of operation 504, circuitry 118 also may coordinate, at least in part, its respective execution, at least in part, of the one or more checkpoints, with respective execution of one or more other respective checkpoints of and/or by one or more other nodes (e.g., node 20 and/or node 30) in system 100. For example, circuitry 118 may exchange data and/or commands with not shown network controller circuitry that may be comprised in node 20 and 30. The exchange of such data and/or commands may be via, for example, one or more dedicated virtual and/or out-of-band channels (not shown) via a not shown distinct reliability, availability, and serviceability (RAS) network that may be comprised in one or more networks 50. The exchanged data and/or commands may ensure that the not shown network controller circuitry in nodes 20 and 30 may perform respective operations that are analogous to operation 504 and its associated operations, with actual or virtual synchronicity with the performance by circuitry 118) of operation 504 and its associated operations. This may result in nodes 10, 20, and 30 synchronizing the actual or virtual time at which they generate and store respective state information in each of the nodes 10, 20 and 30, respectively. This respective state information may have the same and/or analogous characteristics as those of state information 54.

For example, as stated previously, node 10 may comprise memory 120 to store, at least in part, state information 54 that may comprise and/or be indicative, at least in part, of one or more states 161. In this embodiment, node 20 may comprise memory 121 that may have a respective construction and operation that may be the same as the respective construction and operation of memory 120. As a result, at least in part, of the above-described coordination in checkpoint execution, node 20 may store, at least in part, in memory 121 respective state information 60 that may comprise and/or be indicative, at least in part, of one or more states 163 of node 20 and/or one or more components thereof.

Figure 2:
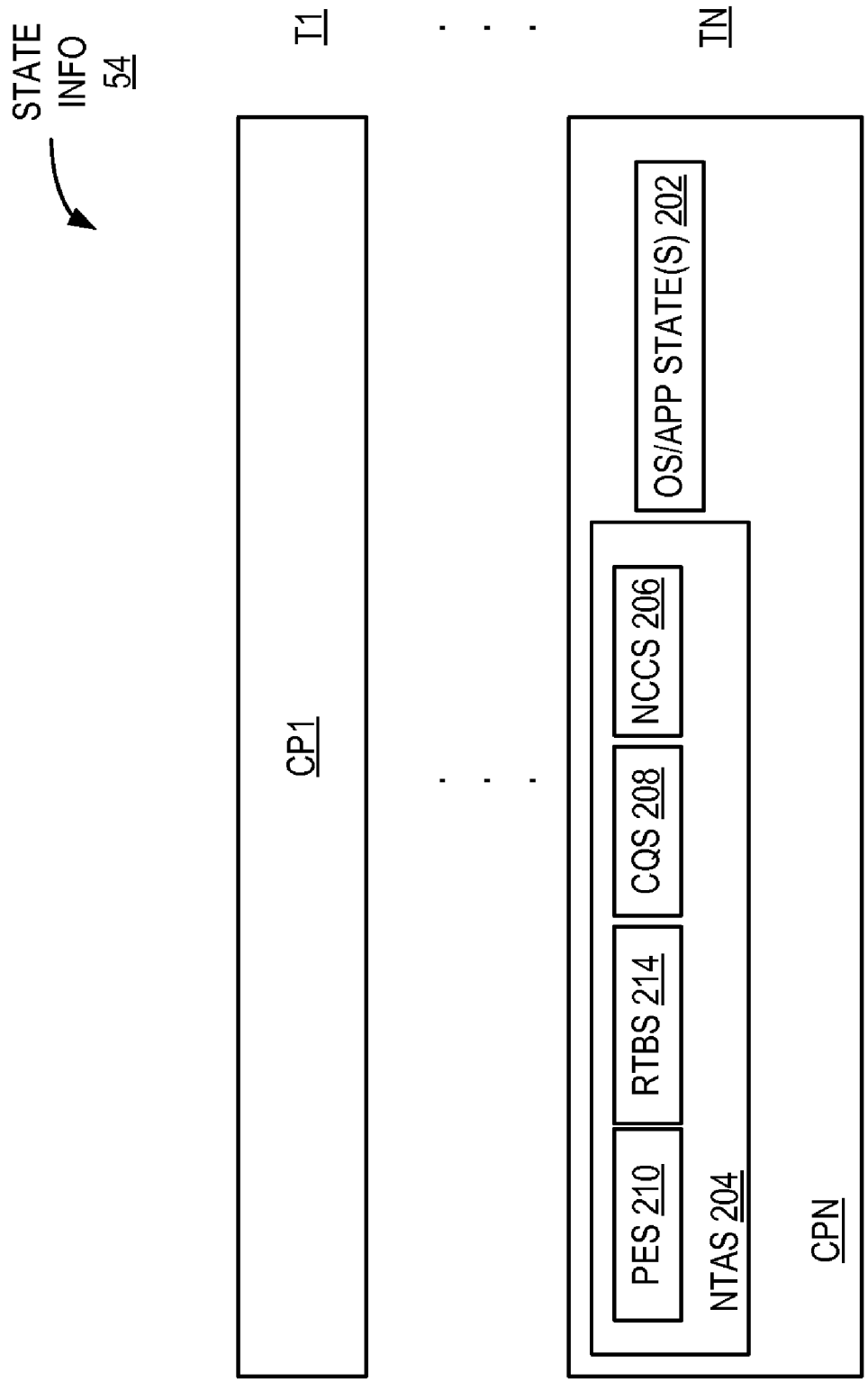
FIG. 2 illustrates information in an embodiment.

In addition or as an alternative to the foregoing, state information 54 may comprise a checkpoint set CP1 . . . CPN, as shown in FIG. 2. In this embodiment, a set may include an integer number of elements that is greater than zero. In system 100, checkpoint set CP1 . . . CPN may comprise a plurality of checkpoints CP1 . . . CPN that circuitry 118 generates and stores, at least in part, in memory at a different respective time T1 . . . TN. For example, CP1 and CPN may be generated and stored, at least in part, by circuitry 118 at times T1 and TN, respectively. Circuitry 118 may permit only a predetermined maximum number of checkpoints to be retained in memory 120. Thus, if a new checkpoint is generated by circuitry 118 after the predetermined maximum number of checkpoints has already been stored in memory 120, circuitry 118 may delete and/or overwrite an algorithmically determined other checkpoint (e.g., the oldest checkpoint) in memory 120 with the newly generated checkpoint.

Each respective checkpoint in the set may comprise the same types of information. For example, as shown in FIG. 2, checkpoint CPN may comprise one or more operating system and/or application states 202 and/or one or more network traffic associated states 204. One or more network traffic associated states 204 may comprise one or more network controller circuitry states (NCCS) 206, one or more command queue states (CQS) 208 (e.g., of one or more not shown command queues in circuitry 118), one or more processing engine states (PES) 210 (e.g., of one or more not shown processing engines in circuitry 118), and/or one or more retransmit buffer states 214 (e.g., of one or more not shown retransmit buffers in circuitry 118). Of course, the types of information and/or states that may be comprised in state information 54, states 161, checkpoints CP1 . . . CPN, etc. are merely exemplary and may vary without departing from this embodiment.

In this embodiment, circuitry 118 may initially attempt to initiate a recovery operation based at least in part upon at least one checkpoint in the checkpoint set (e.g., the latest stored checkpoint CPN). However, if the latest stored checkpoint CPN is found by circuitry 118 to be corrupt or defective (e.g., containing an error correction code, parity, or cyclical redundancy error), and/or otherwise unusable (e.g., as a result of failed checkpoint storage, retrieval, or other operation), circuitry 118 may next attempt to initiate the recovery based at least in part upon the next latest stored checkpoint CP1. This process may be repeated by circuitry 118, until circuitry 118 finds the latest stored, error-free checkpoint (e.g., CP1), and initiates the recovery operation based at least in part upon the latest stored, error-free checkpoint CP1. Advantageously, this may permit system 100 to exhibit an enhanced degree of error resiliency in the event that one or more of the checkpoints stored in memory 120 are corrupt, defective, or otherwise unusable.

If an uncorrectable error is detected, circuitry 118 and/or a not shown out-of-band system (e.g., a not shown reliability, availability, and serviceability network) may initiate a restart, from the most recently saved, error-free checkpoint, of the nodes involved in execution of application 42. Circuitry 118 and/or the not shown out-of-band system may initiate, using principles and/or techniques similar to the principle and/or techniques of operations 502 and/or 504, cessation of the operation of these nodes and their executing applications. Thereafter, circuitry 118 in node 10 (and the respective network controller circuitry in the other nodes) may restore, based at least in part upon the respective most recently saved, error-free checkpoints in the respective nodes the respective states of the respective nodes (including, e.g., their respective components, applications, operating systems, and network controller circuitry). Thereafter, the nodes' respective operations may be restarted.

Although this embodiment contemplates the circuitry 118 initiating and/or directing, at least in part, one or more checkpoints, in addition or as an alternative, operating system 32 and/or one or more applications 42 may initiate and/or direct, at least in part, one or more checkpoints. In this case, at least a portion of state information 54 may be staged to other storage that may internal and/or external to memory 120, and thereafter, may be stored by circuitry 118 to persistent storage (not shown) attached to one or more networks 50. Advantageously, in this case, this may permit a significant portion of checkpoint processing-related operations to be offloaded to the circuitry 118 from the one or more applications 42, and/or may permit the one or more applications to continue meaningful operation while the circuitry 118 carries out the offloaded portion of the checkpoint processing-related operations.

Figure 3:
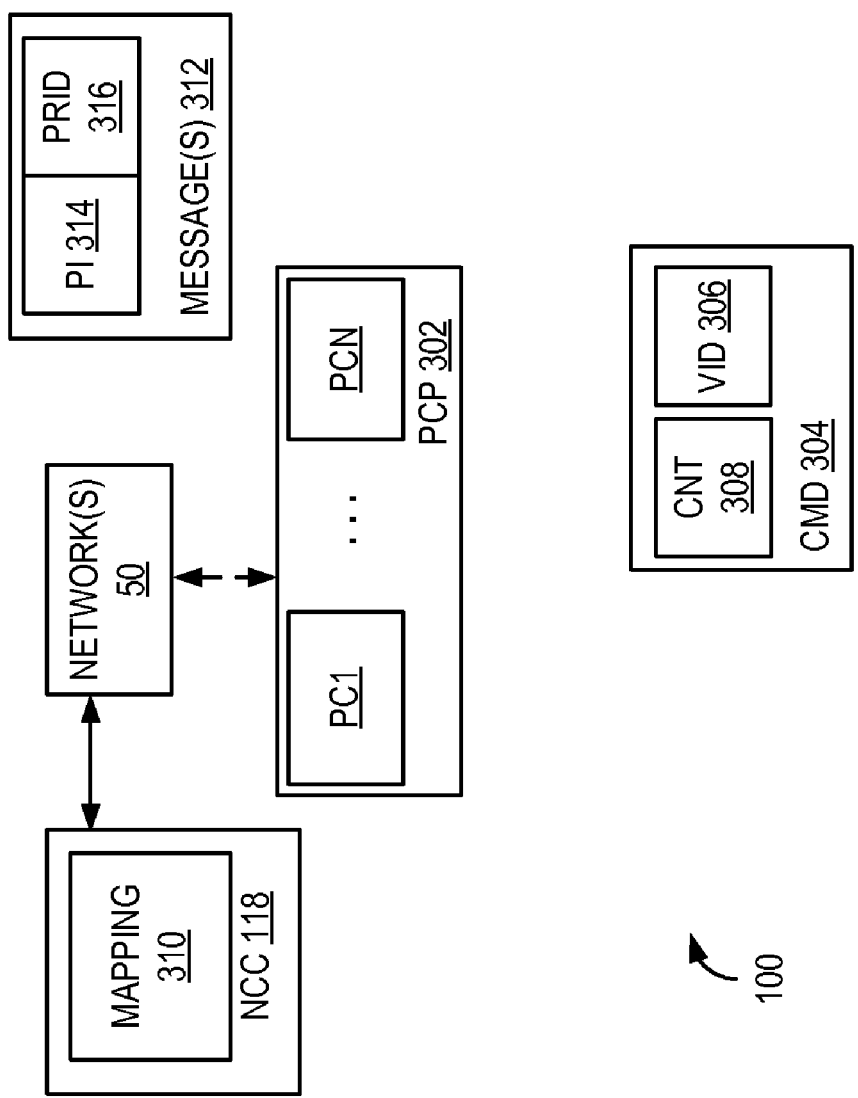
FIG. 3 illustrates a system embodiment.

Address translation by circuitry 118 in an embodiment now will be described. In this embodiment, system 100 may comprise one or more logical processor core pools 302 (PCP, see FIG. 3) that may be coupled to one or more networks 50. For example, each of the host processors that may be comprised in the nodes 10, 20, and/or 30 in system 100 may comprise one or more respective processor cores, and these processor cores PC1 . . . PCN may be comprised in one or more processor core pools 302. Each of these processor cores PC1 . . . PCN may be assigned to one or more virtual identifiers (e.g., logical addresses) and/or one or more physical identifiers (e.g., physical addresses). Each of the cores PC1 . . . PCN also may be capable of executing one or more processes, and these processes may be associated with process contexts and assigned to process identifiers (e.g., process identification numbers).

In the course of execution, one or more applications 42 may generate and/or issue, at least in part, one or more commands (CMD) 304 intended to be executed, at least in part, by one or more processor cores (e.g., PC1) and/or one or more contexts associated with one or more commands 304. Circuitry 118 may receive and translate one or more commands 304 into one or more messages 312 destined for, at least in part, one or more corresponding processor cores PC1 and/or processes.

For example, one or more commands 304 may identify, at least in part, the one or more processor cores PC1 and/or contexts by one or more virtual identifiers (VID 306) and/or one or more contexts (CNT) 308. More specifically, one or more commands 304 may include, specify, indicate, and/or be associated with, at least in part, one or more virtual identifiers 306, and/or one or more contexts 308 associated with the one or more commands 304. However, the one or more messages 312 may include, specify, indicate, and/or be associated with, at least in part, one or more physical identifiers (PI) 314 and/or one or more process identifiers (PRID) 316 intended to receive and/or process one or more messages 312. In this embodiment, an identifier and an address may be used interchangeably, and may comprise one or more symbols and/or values that may be used, for example, to identify, specify, and/or indicate, at least in part, one or more virtual, logical, and/or physical locations.

Circuitry 118 may receive, at least in part, the one or more commands 304. Circuitry 118 may generate, at least in part, one or more messages 312 (and/or one or more PI 314 and/or PRID 316), based at least in part upon commands 304, one or more mappings 310, one or more virtual identifiers 306, and/or the one or more contexts 308. For purposes of this example, one or more destination processor cores PC1 may be comprised in node 20, and similarly, the one or more processes identified, at least in part, by PRID 316 may reside and be executed, at least in part, in node 20. Circuitry 118 may issue, at least in part, one or more messages 312 to node 20 via one or more networks 50. Mapping 310 may be comprised, at least in part, in memory 120 and/or circuitry 199 in circuitry 118.

Figure 4:
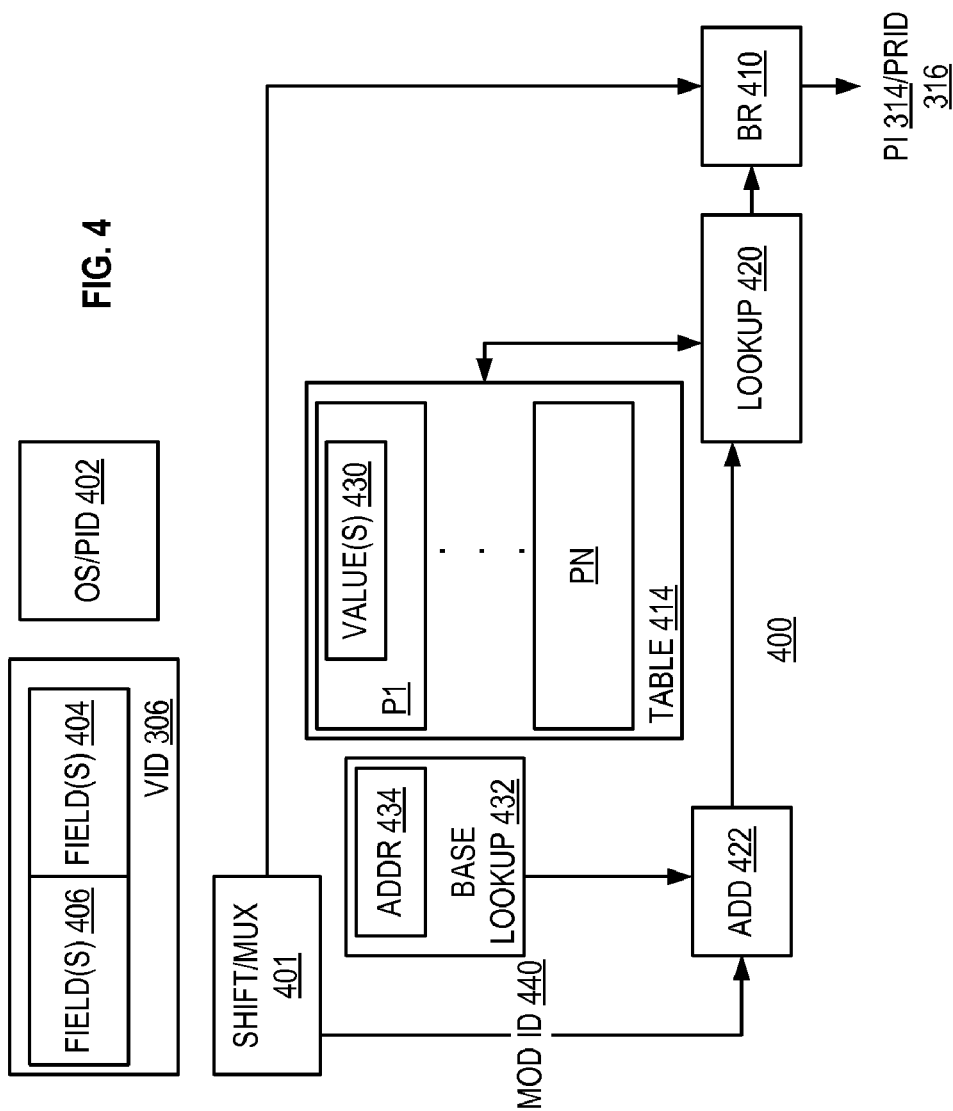
FIG. 4 illustrates operations in an embodiment.

Turning to FIG. 4, operations 400 that may be implemented, at least in part, by circuitry 118 to generate one or more PI 314 and/or one or more PRID 316 will now be described. The one or more contexts 308 may be associated with, at least in part, one or more operating system/process identifiers (OS/PID) 402. One or more OS/PID 402 may be used to look up, in a lookup operation 432, one or base addresses 434. The base addresses that may be accessible in the lookup operation 432 may be pre-programmed into circuitry 118. These base addresses may be associated with and/or correspond to respective contexts that may be addressable via respective PI and/or PRID in system 100. The looking up of different OS/PID combinations in the lookup operation 432 may output, for example, different respective base addresses, with each such combination being mapped one-to-one to a respective base address. For example, one or more mappings 308 may comprise a table 414 that may be partitioned into a plurality of partitions P1 . . . PN. Each partition P1 . . . PN may be assigned and/or correspond to one or more of these contexts. Thus, table 414 may be partitioned among these contexts. The respective base/starting addresses of the respective partitions P1 . . . PN in the table 414 may correspond to base addresses provided by the lookup operation 432. The entries in the table 414 may contain respective values. Each such respective value in the table 414 may comprise both a respective PI and a portion of a respective PRID of a respective process that may be executed by the processor core assigned the respective PI. The circuitry 118 may be programmable such that this portion of the respective PRID may be either a high order or low order portion of the respective PRID.

One or more virtual identifiers 306 may comprise one or more fields 404 and/or one or more fields 406. Shift/mux operation 401 may separate one or more fields 406 from one or more fields 404, may pass (i.e., as one or more modified identifiers 440) one or more fields 406 to addition operation 422, and may pass one or more fields 404 to bit replacement (BR) operation 410. Addition operation 422 may receive, as operands, one or more modified identifiers 440 and one or more base addresses 434. Addition operation 422 may output to lookup operation 420 the arithmetic sum of one or more identifiers 440 and one or more base addresses 434. Lookup operation 420 may output to BR operation 410 the one or more values (e.g., one or more values 430) stored at one or more entries in the table 414 that are addressed by the sum output to lookup operation 420 by addition operation 422. BR operation 410 may append one or more fields 404 to the portion of the PRID output to BR 410 from lookup operation 420, to thereby generate the PRID 316, and may output both the PI 314 (obtained from the one or more values 430) and the PRID 316 for use by the circuitry 118 to generate one or more commands 312. Depending upon whether the portion of the PRID that was comprised in one or more values 430 was selected to be the high order or low order portion of PRID 316, one or more fields 404 may be either the low order portion or high order portion, respectively, of the PRID 316. Alternatively, circuitry 118 may be programmable to discard the one or more fields 404.

By appropriately pre-programming parameters of operations 400, such as, for example, the base addresses output by the lookup operation 432, the values of the entries in the table 414, and which of the fields 404, 406 is respectively input to the addition operation 422 and bit replacement operation 410, it may be possible to map, on an individual context-by-context basis, at least in part, the respective PI and PRID output by operations 400 to respective virtual identifiers and contexts input to the operations 400. Advantageously, in this embodiment, this may provide protection and/or isolation among contexts, while also permitting the table 414 to be shared transparently among multiple processes and/or contexts. For example, for purposes of this embodiment, a single context may comprise a single operating system image (for example, if multiple physical nodes were to utilize circuitry 118), and/or one or more application processes. Additionally or alternatively, multiple contexts may be comprised in a single application. Accordingly, in order to provide protection, at least in part, among such contexts, circuitry 118 may determine whether to permit a particular requested address translation based upon a check of the range of addresses associated with the context.

Additionally, by not basing lookup operation 420 upon one or more fields 404, the address space of table 414 may be reduced. Advantageously, this may reduce the size of the table 414. Also in this embodiment, circuitry 118 may be programmed to append one or more fields 404 (i.e., in operation 410) as the high order portion or low order portion of PRID 316, or to discard one or more fields 404 and not to use them in the PRID 316. Advantageously, this may permit this embodiment to offer improved capability and/or flexibility in balancing possible PRID aliasing/collision versus other system performance trade-offs. Further advantageously, the size of one or more fields 404 may be programmable, to thereby offer improved design flexibility.

Operations 400 have been described in reference to translation of one or more virtual identifiers and/or contexts to one or more physical identifiers and/or process identifiers. However, as will be appreciated by those skilled in the art, circuitry 118 also may use analogous and/or similar techniques to translate one or more physical identifiers and/or process identifiers (e.g., received from one or more nodes 20 via one or more networks 50) so as to generate one or more virtual identifiers and/or contexts.

Additionally, circuitry 118 may be capable of modifying, at least in part, one or more mappings 310 and/or one or more tables 414 after (1) a restart of one or more applications in node 10 and/or system 100, and/or (2) a migration, at least in part, of one or more applications 42 from being executed, at least in part, by one or more initial processor cores (e.g., PC1) to one or more other processor cores (e.g., PCN). Such modification may result, at least in part, from, for example, changes in the configuration of the system 100 and/or assignment of processes to processor cores in the system 100. In the case of a restart, circuitry 118 may be capable of restarting the node 10 based at least in part upon state information 54 and/or one or more of the checkpoints CP1 ... CPN. In either the case of such a restart or migration, as a result at least in part of the one or more mappings 310 and/or tables 414 being comprised in circuitry 118, circuitry 118 may be capable of performing the vast majority of the operations involved in modifying the one or more mappings 310 and/or tables 414 in its own hardware. Advantageously, in this embodiment, this may permit such restart and/or migration to occur transparently, without impact at the user level. Further advantageously, in this embodiment, such restart and migration may be carried out without a global communications reconfiguration of the system 100. Also advantageously, in this embodiment, address assignment may be carried out with improved flexibility.

Thus, an embodiment may include network controller circuitry to be included in a first host computer that includes a host processor to execute an operating system environment. The circuitry may initiate, at least in part, one or more checkpoints of, at least in part, one or more states associated with, at least in part, the operating system environment and network traffic between the first host computer and a second host computer. The circuitry also may coordinate, at least in part, respective execution, at least in part, of the one or more checkpoints with respective execution of one or more other respective checkpoints of the second host computer.

In this embodiment, the vast majority of operations 400 and/or 500 (and their associated operations) may be carried out in hardware (i.e., by NCC 118) and without use of software agents, the operating system environment, and the host processor. Advantageously, in this embodiment, this may offload the vast majority of operations 400 and/or 500 (and their associated operations) to the NCC 118. Advantageously, this may reduce the amount of host processor bandwidth and/or host memory space utilized in this embodiment. Also advantageously, this may improve the speed with which checkpoint-related and/or address translations may be carried out in this embodiment. Further advantageously, by offloading operations 400 to circuitry 118 in this embodiment, network message throughput may be significantly improved, especially in the case of relatively small or random messages.

Also, since the network controller circuitry in the nodes 10, 20, 30 may store respective retransmit buffer state information, communication retries in the system 100 following a restart of system 100 may reconstruct communication protocol state information related to messages that may have been in-flight between or among nodes 10, 20, 30 in the system 100. Advantageously, this may permit the state information stored by the network controller circuitry in this embodiment to be useful even if the system 100 is not placed into quiescence prior to obtaining the information. Advantageously, this may enhance the speed of checkpoint-related operations in this embodiment.

Additionally, in this embodiment, the nodes' respective state information may be stored locally in respective memories that (1) may be directly attached to the respective nodes' network controller circuitry and (2) may have faster access times than electro-mechanical storage. Advantageously, this may reduce amount of access time involved in storing and/or retrieving state information in this embodiment.

What is claimed is:

1. An apparatus comprising:
network controller circuitry to be comprised in a first host computer and in a second host computer, the first host computer including a host processor to execute an operating system environment, the network controller circuitry to initiate, at least in part, one or more checkpoints of, at least in part, one or more states associated with, at least in part, the operating system environment and network traffic between the first host computer and the second host computer, the network controller circuitry also to coordinate, at least in part, respective execution, at least in part, by the network controller circuitry of the one or more checkpoints with respective execution of one or more other respective checkpoints of the second host computer, the network controller circuitry to store respective retransmit buffer state information of the first host computer and the second host computer that permits reconstruction, via use of communication retries following system restart, of communication protocol state information related to in-flight messages between the first host computer and the second host computer.

2. The apparatus of claim 1, wherein:
the first host computer comprises first memory to store, at least in part, first information indicative, at least in part, of the one or more states;

the second host computer comprises second memory to store, at least in part, second information indicative, at least in part, one or more other states of the second host computer;

coordination, at least in part, of the respective executions of the checkpoints comprises synchronization of a time at which to generate the first and second information to be stored in the first memory and the second memory, respectively; and the first memory and the second memory have relatively faster access times relative to an electro-mechanical storage access time, and the first memory is directly attached to the network controller circuitry.

3. The apparatus of claim 1, wherein:

the operating system environment comprises an operating system and one or more applications;

checkpoint execution, at least in part, by the network controller circuitry comprises:

interrupting, at least in part, by the network controller circuitry, the operating system to permit the network controller circuitry to record, at least in part, current states of the operating system and the one or more applications; and ceasing, at least temporarily, by the network controller circuitry transmission of first network traffic to the second host computer and reception by the network controller circuitry of second network traffic to the first host computer to permit the network controller circuitry to record, at least in part, one or more network traffic associated states; and the one or more network traffic associated states are based at least in part upon one or more of the following: one or more network controller circuitry states, one or more command queue states, one or more processing engine states, one or more application states, and one or more retransmit buffer states.

4. The apparatus of claim 1, wherein:

the network controller circuitry is to store a checkpoint set, each respective checkpoint in the set being stored at a different respective time;

the network controller circuitry is to initiate recovery of the first host computer based at least in part upon at least one checkpoint in the set;

the at least one checkpoint comprises a latest stored, error-free checkpoint;

the first host computer comprises a circuit board; and the network controller circuitry is comprised, at least in part, in a circuit card to be coupled to the circuit board.

5. The apparatus of claim 1, wherein:

the network controller circuitry is to be coupled to a network that is coupled to a processor core pool;

the network controller circuitry is to receive a command generated at least in part by an application in the operating system environment, the command including one or more virtual identifiers identifying, at least in part, one or more destination processor cores in the processor core pool and one or more contexts intended to receive, at least in part, a message, the message to be generated, at least in part by the network controller circuitry, based at least in part upon the command; and the network controller circuitry is to generate, at least in part, one or more physical identifiers of the one or more destination processor cores and one or more process identifiers to receive the message, based at least in part upon a mapping in the network controller circuitry, the one or more virtual identifiers, and the one or more contexts.

6. The apparatus of claim 5, wherein:

the network controller circuitry is to modify, at least in part, the mapping after at least one of (a) a restart, based at least in part upon one or more of the checkpoints, of the application, and (b) a migration, at least in part, of the application from one or more initial processor cores to one or more other processor cores.

7. The apparatus of claim 5, wherein:

the one or more virtual identifiers comprise one or more fields;

the mapping comprises a table partitioned among a plurality of contexts;

the network controller circuitry is to access one or more values in the table based at least in part upon one or more base addresses associated with the plurality of contexts and one or more modified identifiers, the one or more modified identifiers being the one or more virtual identifiers absent the one or more fields; and the one or more process identifiers are generated based at least in part upon the one or more values and the one or more fields.

8. A method comprising:

initiating, at least in part, by network controller circuitry, one or more checkpoints, the network controlling circuitry to be comprised in a first host computer and in a second host computer, the first host computer including a host processor to execute an operating system environment, the one or more checkpoints being of, at least in part, one or more states associated with, at least in part, the operating system environment and network traffic between the first host computer and the second host computer, the network controller circuitry also to coordinate, at least in part, respective execution, at least in part, by the network controller circuitry of the one or more checkpoints with respective execution of one or more other respective checkpoints of the second host computer, the network controller circuitry to store respective retransmit buffer state information of the first host computer and the second host computer that permits reconstruction, via use of communication retries following system restart, of communication protocol state information related to in-flight messages between the first host computer and the second host computer.

9. The method of claim 8, wherein:

the first host computer comprises first memory to store, at least in part, first information indicative, at least in part, of the one or more states;

the second host computer comprises second memory to store, at least in part, second information indicative, at least in part, one or more other states of the second host computer;

coordination, at least in part, of the respective executions of the checkpoints comprises synchronization of a time at which to generate the first and second information to be stored in the first memory and the second memory, respectively; and the first memory and the second memory have relatively faster access times relative to an electro-mechanical storage access time, and the first memory is directly attached to the network controller circuitry.

10. The method of claim 8, wherein:

the operating system environment comprises an operating system and one or more applications;

checkpoint execution, at least in part, by the network controller circuitry comprises:

interrupting, at least in part, by the network controller circuitry, the operating system to permit the network controller circuitry to record, at least in part, current states of the operating system and the one or more applications; and ceasing, at least temporarily, by the network controller circuitry transmission of first network traffic to the second host computer and reception by the network controller circuitry of second network traffic to the first host computer to permit the network controller circuitry to record, at least in part, one or more network traffic associated states; and the one or more network traffic associated states are based at least in part upon one or more of the following: one or more network controller circuitry states, one or more command queue states, one or more processing engine states, one or more application states, and one or more retransmit buffer states.

11. The method of claim 8, wherein:
the network controller circuitry is to store a checkpoint set, each respective checkpoint in the set being stored at a different respective time;
the network controller circuitry is to initiate recovery of the first host computer based at least in part upon at least one checkpoint in the set;
the at least one checkpoint comprises a latest stored, error-free checkpoint;
the first host computer comprises a circuit board; and
the network controller circuitry is comprised, at least in part, in a circuit card to be coupled to the circuit board.

12. Computer-readable memory storing one or more instructions that when executed by a machine result in performance of operations comprising:
initiating, at least in part, by network controller circuitry, one or more checkpoints, the network controller circuitry to be comprised in a first host computer and in a second host computer, the first host computer including a host processor to execute an operating system environment, the one or more checkpoints being of, at least in part, one or more states associated with, at least in part, the operating system environment and network traffic between the first host computer and the second host computer, the network controller circuitry also to coordinate, at least in part, respective execution, at least in part, by the network controller circuitry of the one or more checkpoints with respective execution of one or more other respective checkpoints of the second host computer, the network controller circuitry to store respective retransmit buffer state information of the first host computer and the second host computer that permits reconstruction, via use of communication retries following system restart, of communication protocol state information related to in-flight messages between the first host computer and the second host computer.

13. The computer-readable memory of claim 12, wherein:
the first host computer comprises first memory to store, at least in part, first information indicative, at least in part, of the one or more states;
the second host computer comprises second memory to store, at least in part, second information indicative, at least in part, one or more other states of the second host computer;
coordination, at least in part, of the respective executions of the checkpoints comprises synchronization of a time at which to generate the first and second information to be stored in the first memory and the second memory, respectively; and
the first memory and the second memory have relatively faster access times relative to an electro-mechanical storage access time, and the first memory is directly attached to the network controller circuitry.

14. The computer-readable memory of claim 12, wherein:
the operating system environment comprises an operating system and one or more applications;
checkpoint execution, at least in part, by the network controller circuitry comprises:
interrupting, at least in part, by the network controller circuitry, the operating system to permit the network controller circuitry to record, at least in part, current states of the operating system and the one or more applications; and ceasing, at least temporarily, by the network controller circuitry transmission of first network traffic to the second host computer and reception by the network controller circuitry of second network traffic to the first host computer to permit the network controller circuitry to record, at least in part, one or more network traffic associated states; and the one or more network traffic associated states are based at least in part upon one or more of the following: one or more network controller circuitry states, one or more command queue states, one or more processing engine states, one or more application states, and one or more retransmit buffer states.

15. The computer-readable memory of claim 12, wherein:
the network controller circuitry is to store a checkpoint set, each respective checkpoint in the set being stored at a different respective time;
the network controller circuitry is to initiate recovery of the first host computer based at least in part upon at least one checkpoint in the set;
the at least one checkpoint comprises a latest stored, error-free checkpoint;
the first host computer comprises a circuit board; and
the network controller circuitry is comprised, at least in part, in a circuit card to be coupled to the circuit board.

16. The computer-readable memory of claim 12, wherein:
the network controller circuitry is to be coupled to a network that is coupled to a processor core pool;
the network controller is to receive a command generated at least in part by an application in the operating system environment, the command including one or more virtual identifiers identifying, at least in part, one or more destination processor cores in the processor core pool and one or more contexts intended to receive, at least in part, the command; and
the network controller circuitry is to generate, at least in part, based at least in part upon a mapping in the network controller circuitry, the one or more virtual identifiers, and the one or more contexts, one or more physical identifiers of the one or more destination processor cores and one or more process identifiers to receive the command.

17. The computer-readable memory of claim 16, wherein:
the network controller circuitry is to modify, at least in part, the mapping after at least one of (a) a restart, based at least in part upon one or more of the checkpoints, of the application, and (b) a migration, at least in part, of the application from one or more initial processor cores to one or more other processor cores.

18. The computer-readable memory of claim 16, wherein:
the one or more virtual identifiers comprise one or more fields;
the mapping comprises a table partitioned among a plurality of contexts;

the network controller circuitry is to access one or more values in the table based at least in part upon one or more base addresses associated with the plurality of contexts and one or more modified identifiers, the one or more modified identifiers being the one or more virtual identifiers absent the one or more fields; and the one or more process identifiers are generated based at least in part upon the one or more values and the one or more fields.

* * * * *